United States Patent [19]

Stemme et al.

[11] 4,203,662
[45] May 20, 1980

[54] TRIGGER MECHANISM FOR PHOTOGRAPHIC CAMERA PROVIDED WITH MOTOR-DRIVEN FILM-TRANSPORT MECHANISM

[75] Inventors: Otto Stemme, Munich; Peter Lermann, Feldkirchen; Rolf Schröoder, Baldham; Horst Karl, Munich, all of Fed. Rep. of Germany

[73] Assignee: AGFA-Gevaert AG, Leverkusen, Fed. Rep. of Germany

[21] Appl. No.: 16,894

[22] Filed: Mar. 2, 1979

Related U.S. Application Data

[63] Continuation-in-part of Ser. No. 939,374, Sep. 5, 1978.

[30] Foreign Application Priority Data

Sep. 25, 1978 [DE] Fed. Rep. of Germany ....... 2841604

[51] Int. Cl.² .................... G03B 1/18; G03B 17/38
[52] U.S. Cl. .................... 354/173; 354/266
[58] Field of Search ............. 354/170, 173, 204, 206, 354/212–214, 275, 266, 268, 207

[56] References Cited

U.S. PATENT DOCUMENTS

| | | | |
|---|---|---|---|
| 2,969,722 | 1/1961 | Schwartz | 354/173 |
| 3,059,557 | 10/1962 | Rentschler | 354/268 |
| 3,094,033 | 6/1963 | Thiele et al. | 354/173 X |
| 3,135,182 | 6/1964 | Hintze et al. | 354/173 |
| 3,470,803 | 10/1969 | Fukuoka et al. | 354/173 X |
| 4,001,849 | 1/1977 | Takahashi | 354/207 |
| 4,075,644 | 2/1978 | Hosono | 354/173 |
| 4,133,608 | 1/1979 | Tanaka | 354/266 X |

Primary Examiner—Donald A. Griffin
Attorney, Agent, or Firm—Michael J. Striker

[57] ABSTRACT

When the user presses the trigger button, a rod is pulled longitudinally by a drive spring in a first direction from a first to a second position triggering the shutter in the process and a coupling thereafter couples the rod to a transport motor which returns the rod in the opposite second direction back to first position, the rod resetting the shutter in the process, the rod when returned to second position becoming decoupled from the motor so that the latter will not oppose the force of the drive spring for the next first-direction movement of the rod. The crank rod is blocked against first-direction movement by two blocking levers, the first initially being in blocking position and the second initially in unblocking position. When the user presses the trigger button, the first blocking lever unblocks the rod and the latter performs its first-direction movement, the first lever remaining in unblocking position until the user releases the trigger button, and near the end of the second-direction movement of the rod the second blocking lever snaps into blocking position, to prevent an unintentional second exposure, the second blocking lever blocking the rod until the first lever, upon release of the trigger button, can return to blocking position, whereupon the second lever once more assumes unblocking position. When instead of single exposures exposure sequences are to be made, the user sets a manual switch which arrests the second lever in unblocking position, so that the rod performs its first- and second-direction movements alternately for as long as the user keeps the trigger button depressed.

14 Claims, 1 Drawing Figure

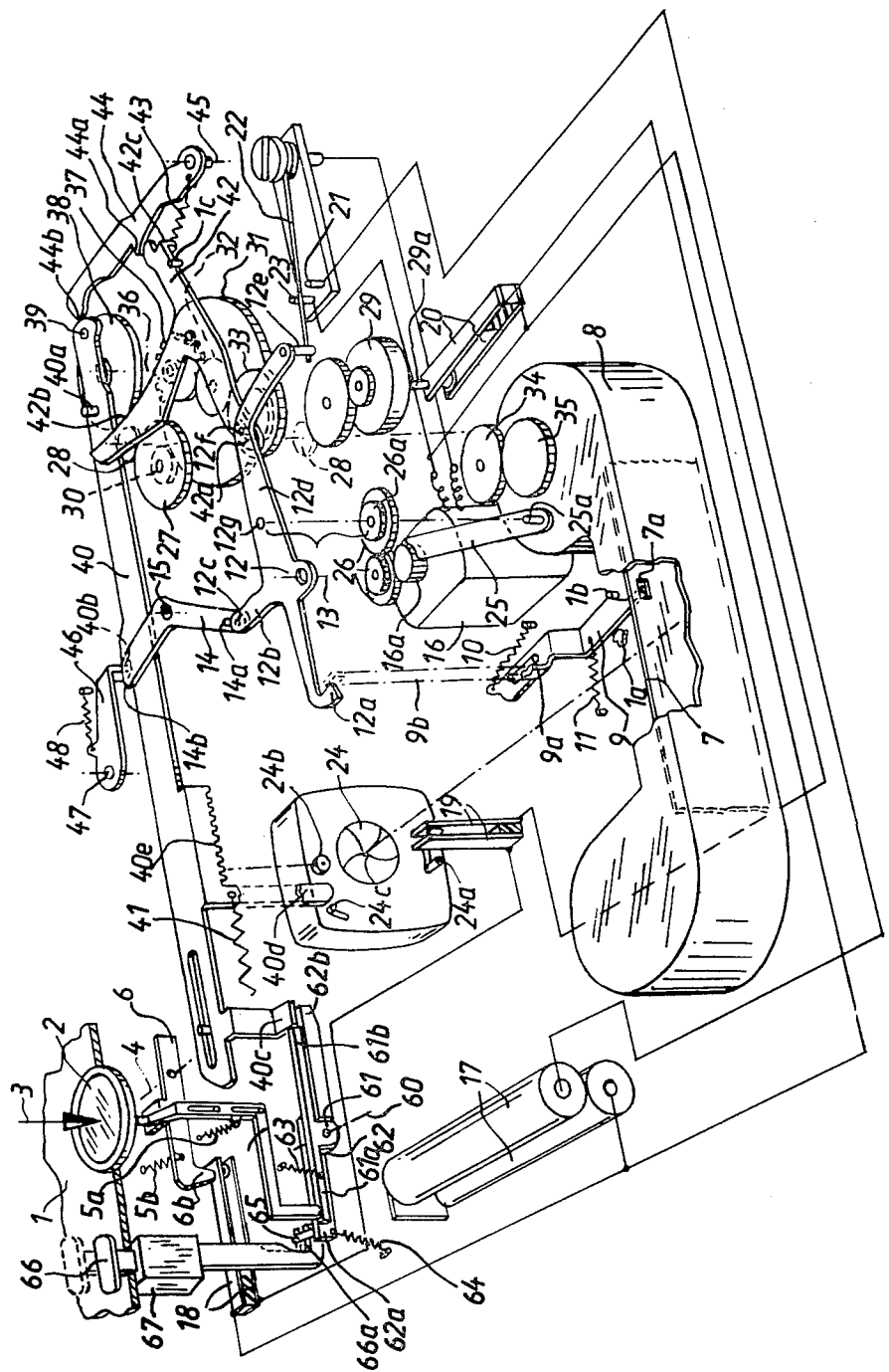

TRIGGER MECHANISM FOR PHOTOGRAPHIC CAMERA PROVIDED WITH MOTOR-DRIVEN FILM-TRANSPORT MECHANISM

CROSS-REFERENCE TO RELATED APPLICATION

The present application is a continuation-in-part of our commonly assigned copending application Ser. No. 939,374, filed Sept. 5, 1978, and entitled "FILM-TRANSPORT SYSTEM FOR PHOTOGRAPHIC STILL CAMERA."

BACKGROUND OF THE INVENTION

The parent application identified above discloses a film transport system in which an elongated control member, preferably a crank rod or for example a rack, is spring-driven in a first direction from a first to a second position when the user depresses the camera's release button, the rod triggering a shutter operation during its first-direction movement, or else performing some other camera function. Upon completion of the first-direction movement, the transport motor of the camera's film transport system becomes coupled to the rod and drives it in the opposite second direction back towards the first position, during which for example the rod resets the shutter and/or performs other functions. When the rod is returned by the motor to its original position, the rod becomes decoupled from the motor, so that the motor cannot counteract the force of the drive spring which drives the rod in its first direction.

In the system disclosed in that application, the rod is arrested in first position by a blocking or trigger lever, and to initiate an exposure the user depresses the camera's trigger or release button, causing such trigger lever to move to an unblocking position, permitting the rod to be driven in the first direction by the drive spring. If the user wishes to operate the camera in the sequential exposure mode, the user keeps the release button uninterruptedly depressed for as long as he wishes the exposure sequence to continue.

Most users, when wishing only a single exposure, will instinctively let go of the camera's trigger button and thereby reblock the control rod before the control rod can begin another first-direction spring-powered stroke, or else such users quickly learn and become confortable with the fact that they must do so. Other users, however, have the habit of persistently holding down the trigger button even when a single exposure is intended, and for these users such a technique for selecting between the single-exposure mode and the sequential-exposure mode is very troublesome.

SUMMARY OF THE INVENTION

It is accordingly a general object of the invention to prevent, in a camera mechanism of the type in question, the user from inadvertently initiating an exposure sequence when only a single shot is intended.

The present invention provides a mechanism requiring the user to set a switch, or perform an equivalent separate decision concerning the selected mode of operation, before pressing down upon the camera's trigger button.

In the preferred embodiment of the present invention, two blocking devices are utilized to block the control rod or other such control member in the first position of the control member. The first blocking device unblocks the control rod in response to depression of the camera's release button, so that the control rod performs a first-direction spring-driven stroke followed by a second-direction motor-driven stroke, but near the end of the motor-driven stroke, if it should happen that the first blocking device is still in its unblocking setting, a second blocking device snaps into blocking setting and prevents a further spring-driven first-direction stroke of the control rod.

Preferably, when the first blocking device is ultimately returned to blocking position, the second blocking device is constrained to return to unblocking position, to ready the trigger mechanism for the next cycle of operation.

If the user intends to shoot in the sequential-exposure mode, he sets a mechanical switch on the camera to a setting for such mode, and this arrests the second blocking device in the unblocking setting thereof, as a result of which first- and second-direction strokes of the control rod will anternate repeatedly until such time as the user ultimately lets go of the camera's trigger button.

Although this expedient provides a reliable way of preventing inadvertent initiation of exposure sequences when only single exposures are desired, it will be understood that the triggering technique of the parent application also has characteristic advantages. Thus, for example, a sophisticated user may decide between single-exposure and sequential-exposure modes of operation instantly, e.g., as he is peering through the camera's view-finder and in dependence upon what the subject being photographed is doing, and such sophisticated users may be inconvenienced by the need to first set a separate manual switch each time a changeover between the two exposure modes is desired.

Accordingly, it is a secondary object of the invention to provide a triggering technique which spares the sophisticated user the need for separate manual exposure-mode selection. This is readily accomplished with the double-blocking-device triggering technique of the present invention. The sophisticated user can keep the manual mode selection switch in the sequential-exposure setting all the time, with the result that the double-blocking-device triggering mechanism converts to a single-blocking-device triggering mechanism substantially identical to that disclosed in the parent case, and operable by the user in the same manner as the triggering device employed in the parent case.

Within the context of these general objects, the present invention also seeks to provide a double-blocking-device trigger mechanism which is of extreme simplicity, spatial compactness and operational reliability, and features pertaining to these objects will best be understood from the description of the presently preferred embodiment. The scope of the invention itself, however, is to be understood in terms of the definitions of the various aspects of it constituted by the appended claims.

BRIEF DESCRIPTION OF THE DRAWING

The single FIGURE is an exploded perspective view of one exemplary embodiment of the invention.

DESCRIPTION OF A PREFERRED EMBODIMENT

The single FIGURE is an exploded perspective view of the presently preferred, but nevertheless a merely exemplary embodiment of the present invention.

To an extent, the system depicted in the FIGURE is the same as that disclosed in our copending and commonly assigned application Ser. No. 939,374 filed Sept. 5, 1978.

In the FIGURE, numeral 1 denotes part of the housing of a photographic camera. Numeral 2 denotes a release button which the user depresses in the direction of arrow 3 to initiate an exposure or exposure sequence. When release button 2 is depressed, it depresses a vertically slidable link 6a against the action of a tension spring 5a; link 6a is guided for vertical shifting motion by means of two illustrated pins and slots, and link 6a comprises four legs each extending out perpendicular to the one before it. Depression of release button 2 furthermore results in depression of a switch-activating lever 6b, with the result that lever 6b is pressed counterclockwise about its horizontal pivot at 4 against the action of a tension spring 5b. When lever 6b is thusly moved counterclockwise its left end closes a switch 18, discussed below.

Two two-armed levers 61, 62 are individually pivotable about a common horizontal pivot indicated at 60. Lever 61 has left and right lever arms denoted 61a and 61b, respectively; lever 62 has left and right lever arms denoted 62a and 62b, respectively. As viewed in the FIGURE, the left lever arm 62a of lever 62 is located behind the left lever arm 61a of lever 62; the right lever arm 62b of lever 62 is located beneath the right lever arm 61b of lever 61. The right end of right lever arm 62b extends farther to the right than the right lever arm 61a.

A tension spring 63 attempts to pull lever 61 clockwise and a tension spring 64 attempts to pull lever 62 counterclockwise. In the illustrated, undepressed state of release button 2, spring 63 keeps the left arm 61a of lever 61 biased upwards against the lower end of the four-legged link 6a. When release button 2 is depressed and link 6a descends, the lower end of link 6a depresses the left arm 61a of lever 61, causing lever 61 to pivot counterclockwise about pivot 60. The lower end of link 6a is in direct engagement with the left arm 61a of lever 61, but is not similarly in direct engagement with lever 62.

Numeral 40 denotes a crank rod pivoted at 39 to a crank wheel 38. The opertion of crank rod 40 is described in detail below. Briefly, however, when release button 2 is depressed, a tension spring 41 pulls crank rod 40 leftwards, and during the leftwards stroke of crank rod 40 the rod 40 trips the camera's shutter mechanism. Upon completion of its leftwards stroke, crank 40 is driven rightwards, back to its starting position, by means of an electric motor 16 through intermediate gearing, in a manner described in detail below; during its rightwards stroke, crank rod 40 effects resetting of the camera's shutter mechanism.

At its left end, crank rod 40 is provided with a horizontally extending bent tab 40c. In the illustrated setting of the mechanism illustrated, the left edge of tab 40c is blocked by the end of the right lever arm 61b, so that tension spring 41 cannot drive crank rod 40 leftwards.

The left arm 62a of lever 62 carries a pin 65 which rests on the hook 66a of a vertically displaceable push button rod 66. Rod 66 is guided through a mechanism 67 of per se conventional design, rod 66 and mechanism 67 together forming a conventional push-to-engage push-to-release mechanism. The pushbutton atop rod 66 is shown in solid lines in the lowered setting of rod 66, and in broken lines in the elevated setting of rod 66. If the rod 66 is in the solid-line lowered setting, and the user depresses the pushbutton atop rod 66 and then lifts his finger off the pushbutton, the pushbutton rod 66 assumes its broken-line elevated setting. Conversely, if the rod 66 is in its broken-line elevated setting, and the user depresses the pushbutton atop rod 66 and then lifts his finger off the pushbutton, the pushbutton rod 66 assumes its solid-line lowered setting.

The hook 66a at the lower end of pushbutton rod 66 is shown in the lowered setting of the rod 66. If the pushbutton 66 is in its solid-line lowered setting, and the user depresses the pushbutton and then lifts his finger off of it, the hook 66a rises from its illustrated lowered setting to its elevated setting, causing lever 62 to turn clockwise against the resisting force of tension spring 64, so that the right arm 62b of lever 62 will be located entirely out of the way of the tab 40c on crank rod 40 and be incapable of engaging tab 40c.

The user sets pushbutton rod 66 to its solid-line lowered setting when single exposures are to be made, and sets pushbutton 66 to its broken-line elevated setting when a series of exposures are to be made without repeated depression of the release button 2.

When pushbutton 66 is in its illustrated solid-line lowered setting, for single exposures, the part of the mechanism thus far described operates as follows:

All components are initially in their illustrated settings. The user manually depresses release button 2, and it will be assumed for explanatory purposes that button 2 is kept manually depressed for an indefinitely long period of time. When release button 2 is depressed, lever 6b is turned counterclockwise and closes switch 18, for purposes described below. Also, the lower end of link 6a displaces the lever 61 counterclockwise as a result of which the end of right lever arm 61b moves out of the path of movement of tab 40c, so as no longer to prevent the tension spring 41 from driving the crank rod 40 leftwards. Lever 62 continues to be in its illustrated position.

The crank rod 40 now performs its leftwards stroke, during which occur certain operations described below. During the leftwards stroke of crank rod 40, tab 40c is located above and slides along the top edge of the right arm 62b of lever 62, preventing lever 62 from moving counterclockwise out of its illustrated position.

As described in detail below, when the spring-powered leftwards stroke of crank rod 40 has been completed, crank rod 40 is then driven rightwards by transport motor 16 through intermediate gearing back to its illustrated position. As also described below, after the rightwards motor-driven stroke of crank rod 40 has been performed, crank rod 40 becomes decoupled from transport motor 16, as a result of which transport motor 16 can no longer apply to crank rod 40 a force resisting that of drive spring 41.

During the terminal part of the motor-driven return stroke of crank rod 40, its tab 40c moves rightwards to a position rightwardly beyond the end of lever arm 62b, as a result of which lever arm 62b snaps upwards, under the action of tension spring 64 into the path of movement of tab 40c, thereby preventing drive spring 41 from causing crank rod 40 to perform another leftwards stroke. Thus, if the user is still holding release button 2 in depressed position, with the end of lever arm 61b accordingly still out of the path of movement of tab 40c and, therefore, incapable of preventing a renewed leftwards stroke of rod 40, prevention of a renewed leftwards stroke is assured by the latching action afforded by the end of lever arm 62b.

If now the user finally lets go of release button 2, spring 63 is able to turn lever 61 clockwise back towards its illustrated position. However, before lever 61 actually reaches its illustrated position, the lower surface of its arm 61b engages the upper surface of lever arm 62b, and arm 61b presses arm 62b down out of the path of movement of tab 40c back to the illustrated position of arm 62b, spring 63 being for this purpose stronger than spring 64. As lever arm 62b leaves the path of movement of tab 40c, spring 41 is able to pull crank rod 40 leftwards a very small distance, namely until tab 40c reaches the end of lever arm 61b, both levers 61, 62 having by now reassumed their illustrated positions.

As described below, the shutter mechanism of the camera has now been tripped and reset a single time, and only a single exposure has been performed.

If the user wishes to make a series of exposures, he depresses and then lets go of pushbutton 66, as a result of which pushbutton rod 66 rises to its broken-line elevated position, the hook 66a at the lower end of rod 66 rising the same distance. As pushbutton rod 66 rises into its elevated setting, hook 66a raises the pin 65 on the left arm 62a of lever 62, lever 62 is accordingly displaced clockwise against the force of spring 64 and then held in such position, and the right arm 62b of lever 62 is accordingly lowered into and kept at a position out of the path of movement of tab 40c.

The user now depresses the release button 2 to initiate a series of exposures, and keeps button 2 depressed for as long as the exposure sequence is to continue.

As in the case of the single-exposure mode, lever 6b is pressed counterclockwise and closes switch 18, and link 6a descends causing lever 61 to tilt counterclockwise so that the end of lever arm 61b moves up out of the path of movement of tab 40c. Spring 41 now drives crank rod 40 leftwards, and at the end of the leftwards stroke of rod 40, rod 40 begins to be driven by transport motor 16 in the rightwards direction back towards the starting position of one crank rod. Upon completion of the rightwards stroke, as before, crank rod 40 becomes decoupled from transport motor 16, and motor 16 accordingly no longer supplies a force resisting that of drive spring 41. Now, however, neither lever arm 61b nor lever 62b is located in the path of movement of tab 40c, and spring 41 can in due course initiate the next leftwards stroke of crank rod 40, which is then followed by another motor-driven rightwards stroke; and so forth.

When ultimately the user lets go of release button 2, spring 63 is once more able to move lever 61 back to its illustrated position. If at this time crank rod 40 is in the process of performing its leftwards stroke, tab 40c located beneath lever arm 61b will prevent lever 61 from actually reassuming its illustrated position until the next-following motor-driven rightwards stroke is almost completed, whereupon lever 61 will snap down past tab 40c into the path of movement of the latter, preventing another leftwards stroke of rod 40.

If the user then depresses release button 2 once more, another such exposure sequence is performed. The user can return the camera to its single-exposure mode of operation, by depressing and then letting go of pushbutton 66, whereupon pushbutton 66 will again assume its solid-line lowered setting.

It will be clear that the push-to-engage push-to-release pushbutton mechanism 66, 67 is merely exemplary, and that other equivalent mechanisms could be employed, for example any of various equivalent two-position mechanical switches. However, the illustrated pushbutton mechanism is preferred for several reasons. It can conveniently be located very near to the camera's release button 2, so as to be readily depressed by the same finger which the user is about to employ to depress release button 2. Also, particularly when the lowered setting of the pushbutton mechanism 66, 67 is employed for the single-exposure mode, and the elevated setting for the sequential-exposure mode, there is the advantage that normally, i.e., when operating in the single-exposure mode, the pushbutton can be located close to the surface of the camera housing, whereas if the camera is set for sequential exposures the pushbutton can conspicuously protrude from the camera housing, e.g., by a distance so great that the user, without looking, can use the same finger which he is about to use to press button 2 to first quickly ascertain, by feeling alone, whether pushbutton 66 is in the highly noticeable elevated setting associated with the sequential-exposure mode.

The remainder of the illustrated system and its operation will now be described.

The illustrated camera uses film 7 provided with one perforation 7a per frame. Here the film 7 is accommodated in a cassette 8 comprising a supply compartment at the left, a take-up compartment at the right, and an intermediate bridge provided with an exposure window. The camera housing includes a stationary stop 1a and stationary camming pin 1b, between which can move a feeler 9. Feeler 9 has an elongated slot 9a, up through which extends a stationary vertical pin, mounting the feeler 9 for horizontal swinging movement about such pin, and also for horizontal shifting movement towards and away from the film 7. A tension spring 10 pulls feeler 9 towards the film 7, and a tension spring 11 pulls feeler 9 leftwards, i.e., opposite to the film transport direction. Feeler 9 has a bent-up vertical arm 9b. Vertical arm 9b extends up and ends in the vicinity of one arm 12a of a three-armed control lever 12. To facilitate visualization in this exploded perspective view, vertical arm 9b is shown in broken lines elongated up beyond its actual length, to make clear its cooperation with lever arm 12a. Three-armed control lever 12 is mounted for horizontal swinging movement about a stationary vertical pin, as indicated at 13. The second arm 12b of three-armed control lever 12 carries a pin 12c which extends into a slot 14a at the end of a two-armed lever 14. Two-armed lever 14 is mounted for horizontal swinging movement about a stationary vertical pin, as indicated at 15. The third arm 12d of the control lever 12 is horizontally angled as shown and at its end carries a downwards extending vertical switch-control pin 12e. Control lever 12 also has an aperture 12g.

An electric motor 16 drives the illustrated film-transport system, and is energized by batteries 17. In the current path between motor 16 and batteries 17, there is connected switch 18 already described which closes when pressed down by the left end of lever 6b, i.e., upon depression of release button 2. Connected in series with switch 18 is a switch 19. Connected in parallel to the series-combination of switches 18, 19 is a switch 20. Connected in series with the parallel combination of switches 18, 19 and 20 is a further switch 21, 22. Switch 21, 22 comprises a stationary contact 21 and a moving contact 22. Moving contact 22 also cooperates with a further stationary contact 23, so as to act as a changeover switch. When moving contact 22 engages stationary contact 23, this directly short-circuits the drive motor 16.

Numeral 24 denotes the shutter unit of the camera. The shutter unit 24 has a geared wind-up pinion 24b. When wind-up pinion 24b is turned counterclockwise, it idles; when it is turned clockwise it winds-up or otherwise sets the shutter, via an internal one-way coupling. When the shutter unit 24 is in wound-up or set condition, the shutter can be actuated by moving a shutter-trigger pin 24c from its illustrated position towards the other end of the slot through which it projects, whereupon the shutter will open and then close, after which the shutter unit 24 must then be wound-up or set again. The shutter unit 24 furthermore has a switch-actuating pin 24a projecting out through a slot. When shutter unit 24 is in set condition, i.e., ready to be triggered, switch-actuating pin 24a is, as illustrated, at the left end of its slot. When the shutter unit 24 is triggered, switch-actuating pin 24a moves to the right, closing electrical switch 19 towards or at the end of the shutter operation.

Drive motor 16 has an output pinion 16a which drives a speed-reducing transmission 26. Transmission 26 comprises two two-diameter gears. The drive pinion 16a meshes with the larger-diameter part of the first two-diameter gear; the smaller-diameter part of the first two-diameter gear meshes with the larger-diameter part of the second two-diameter gear; the smaller-diameter part 26a of the second two-diameter gear meshes with a gear 27 (shown further above in this exploded perspective view). Gear 27 meshes with the gear 28 of a centrifugal-force switch 29. To facilitate visualization, gear 28 is illustrated twice, once with a solid lead line to show its cooperation with gear 27, and once with a broken lead line to show its cooperation with centrifugal-force switch 29. Centrifugal-force switch 29 has a downwardly extending switch-actuating pin 29a. Whenever motor 16 is running, pin 29a presses down upon electrical switch 20, keeping switch 20 closed; whenever motor 16 is not running, switch 20 is open. Numeral 25 denotes a braking lever, one end of which can move into and out of engagement with motor drive pinion 16a. The other end of braking lever 25 carries a pin 25a which extends upwards through the aperture 12g in three-armed control lever 12. Braking lever 25 either brakes or does not brake motor drive pinion 16a, depending upon the position of control lever 12, as described further below.

Rigidly coupled to gear 27 is a smaller-diameter gear 30, e.g., of one piece therewith. Gear 30 meshes with a large gear 31. Rigidly coupled to large gear 31 is a smaller diameter gear 32, e.g., of one piece therewith. Gear 32 meshes with a gear 33, and gear 33 with a gear 34, and gear 34 with a gear 35. Gear 35 is coupled to and drives the take-up core located in the interior of the right or take-up end of the cassette 8.

A gear segment 37 and the crankwheel 38 already mentioned are both mounted for rotation about a common stationary vertical pin, as indicated at 36. Gear segment 37 and crankwheel 38 are rigidly coupled to each other, i.e., they share rotation. Depending upon the angular position of crankwheel 38, gear segment 37 does or does not mesh with gear 27. When gear segment 37 meshes with gear 27, it is driven by the latter. The crankwheel 38 carries the eccentrically located vertical pin 39, and, as already described, the right end of crank rod 40 is pivotally mounted on pin 39. Crank rod 40 carries a vertical camming pin 30a. Approximately midway between its right and left ends, crank rod 40 has a rearwardly extending projection, the left edge 40b of which acts as a holding edge, whose purpose is described below. At its left end, crank rod 40 has an elongated slot, up through which projects a stationary vertical pin (no reference numeral) which guides crank rod 40 for lengthwise displacement. Crank rod 40, near its left end, has a bent-down part, the bottom edge of which is configured as a rack 40e. Rack 40e meshes with the wind-up or setting pinion 24b of the shutter unit 24. The drive spring 41 already described is connected to this bent-down part of crank rod 40 and pulls crank rod 40 leftward, i.e., in the direction opposite to the wind-up direction for wind-up pinion 24b. This bent-down part of crank rod 40 extends further down as a trigger arm 40d. When crank rod 40 moves to the left, trigger arm 40d displaces pin 24c, thereby triggering shutter unit 24.

Numeral 42 denotes a second three-armed lever. The first arm 42a of this lever has a slot, through which extends a vertical pin 12f carried by the arm 12d of the three-armed control lever 12. The second arm of three-armed lever 42 is located in the path of movement of pin 40a and its right edge is configured as a camming surface 42b. The third arm of lever 42 has a holding edge 42c. A tension spring 43 pulls lever 42 towards a stationary stop 1c. Numeral 44 denotes a one-armed lever mounted for horizontal swinging movement about a vertical pin, as indicated at 45. One end of the just-mentioned tension spring 43 is connected to three-armed lever 43, and the other end of spring 43 is connected to one-armed lever 44. Lever 44 has a leftwards projection, the back edge 44a of which is a blocking edge. Spring 43 pulls blocking edge 44a towards the holding edge 42c, and also pulls the rear end 44b of lever 44 towards the right end of the crank rod 40. Numeral 46 denotes a further one-armed lever mounted for horizontal swinging movement about a stationary vertical pin, as indicated at 47. The earlier-mentioned two-armed lever 14, at its rearward end, has a rearwards facing control edge 14b. A tension spring 48 pulls one-armed lever 46 towards the control edge 14b and into a position blocking the holding edge 40b of the crank rod 40.

The illustrated film-transport system is shown in the FIGURE in the setting which it assumes upon completion of a film-transport operation. The electrical switches 18, 19, 20, 21 are all open, and the motor 16 is short-circuited by the switch 22, 23. The end of the right arm 61b of trigger lever 61 blocks the trigger tab 40c of the crank rod 40, holding the latter in its cocked position, i.e., with tension spring 41 stretched. The front end of feeler 9 extends into a film-frame perforation 7a. Because of this, and via the engagement between arm 9a and arm 12a, three-armed lever 12 causes two-armed lever 14 to push, at its rearwards control edge 14b, against the one-armed lever 46, keeping the latter swung back away from the holding edge 40b; i.e., in the illustrated setting of the system, the crank rod 40 is not blocked at its holding edge 40b.

Now, assume that the user depresses release button 2. Lever 6b swings counterclockwise, closing switch 18. Switch 18 stays closed so long as trigger button 2 continues to be depressed. At the same time, via trigger link 6a, lever arm 61b moves up out of the path of trigger tab 40c, thereby releasing crank rod 40. Tension spring 41 begins to pull crank rod 40 leftwards, i.e., opposite to the film-transport direction. As a result crankwheel 38 and together therewith gear segment 37 begin to turn. As crank rod 40 moves leftwards, its downwardly projecting trigger arm 40d displaces trigger pin 24c leftwards, thereby triggering a shutter operation. Upon completion of the shutter operation, pin 24a closes switch 19, so that now both switches 18, 19 are closed.

Furthermore, simultaneously with the foregoing, the first tooth of gear segment 37 has begun to mesh with gear 32. Also, the pin 40a on crank rod 40 has engaged the camming surface 42b of the second two-armed lever 42 and has swung lever 42 counterclockwise to such an extent that the blocking edge 44a of one-armed lever 44 latches in front of the holding edge 42c of second two-armed lever 42 and holds lever 42 in that position. Also, this counterclockwise swinging of lever 42, due to the pin and slot coupling at 42a, 12f, has caused the first three-armed lever 12 to turn clockwise so that its arm 12a has moved back and unblocked arm 9b and also caused braking lever 25 to move away from motor drive pinion 16a.

As a result of such clockwise displacement of three-armed lever 12, its pin 12e ceases to press the springy movable contact 22 into engagement with stationary contact 23, so that contact 22 due to its own spring action has now moved into engagement with stationary contact 21. Because now the three switches 18, 19 and 21, 22 are all closed, the motor 16 begins to operate. However, as soon as motor 16 starts up, the switch-actuating pin 29a of centrifugal switch 20 closes switch 20, and keeps switch 20 closed so long as the motor is running. Accordingly, the user can now let go of trigger button 2, and although switch 18 then opens, switch 20, being connected in parallel to the series combination of switches 18, 19, keeps the motor 16 energized. Because of this, when switch 19 too later opens, i.e., upon resetting of the shutter unit 24, this likewise will not terminate motor energization.

With the motor 16 now running, the crankwheel 38 is driven counterclockwise, via the gear segment 37 and the gear 32. As a result, the crank rod 40 is pulled rightwards, i.e., in the film-transport direction, against the opposition of tension spring 41. Also, through the intermediary of gears 31-35, the take-up core in the film cassette 8 is turned, resulting in film transport.

During the first phase of film transport, the part of film 7 just upstream of film perforation 7a pushes the end of perforation feeler 9 rightwards, but as this happens the camming pin 1b is engaged by the slanting camming surface at the right edge of feeler 9, causing feeler 9 to retract away from the film 7. As soon as the feeler 9 has emerged from film perforation 7a, tension spring 11 pulls feeler 9 leftwards until feeler 9 reaches stop 1a. As a result, feeler 9 cannot enter a second time into this same film perforation 7a. Instead, under the action of its springs 10, 11, the feeler 9 is pressed leftwards against stop 1a and forwards against the film 7. With feeler 9 in this setting during the film-transport operation, the tension spring 43 is urging the three-armed lever 42 clockwise and the latter is urging the three-armed lever 12 counterclockwise, with the front edge of arm 12a pressed against the back edge of arm 9b, so that feeler 9 is additionally pressed against film 7 from behind. Also, because arm 12a is pressing against arm 9b, three-armed lever 12 cannot turn further counterclockwise, and three-armed lever 42 cannot turn further clockwise, i.e., despite the pull exerted upon lever 42 by tension spring 43. As a result, during the remainder of the film-transport operation, neither of the three-armed levers 12, 42 can leave the position just described, i.e., even when, somewhat later during the rightwards travel of crank rod 40, pin 40a no longer blocks lever 42 against clockwise movement and blocking edge 44a likewise no longer blocks lever 42 against clockwise movement; blocking edge 44a ceases to block clockwise movement of lever 42, when the right end of crank rod 40 displaces the free end 44b of one-armed lever 44 rightwards. Also, with three-armed lever 12 arrested in the position just described, it can no longer push one-armed lever 46 back via two-armed lever 14. As a result, the free end of one-armed lever 46 is not being pushed back out of the path of movement of holding edge 40b. This makes it impossible for the tension spring 41 to again pull crank rod 40 leftwards prior to completion of the still ongoing film-transport operation.

As the crank rod 40 moves rightwards, i.e., in the film-transport direction, its rack 40e drives wind-up pinion 24b clockwise, thereby winding-up or otherwise setting shutter unit 24 to a condition again ready to be triggered. With shutter unit 24 thusly reset, switch-actuating pin 24a reassumes its illustrated position permitting electrical switch 19 to open. As mentioned just above, because the series-connected switches 18, 19, both of which are now open, are shunted by closed switch 20, the drive motor 16 continues to be energized.

During the leftwards and then rightwards movement of crank rod 40, pin 40a slides along the cam surface 42b of three-armed lever 42 until, at the completion of one rotation of crankwheel 38, the crank rod 40 has returned to the position illustrated in the FIGURE. The gear segment 37 has turned to such an extent that it now ceases to mesh with gear 32, and the right end of crank rod 40 pushes the free end of one-armed lever 44 leftwards against the force of tension spring 43, as a result of which blocking edge 44a moves rightwards out of the path of holding edge 42c, thereby releasing the second three-armed lever 42.

At this point, the film-transport operation has not yet been completed, and the arm 12a is pressing forwards against the arm 9b of feeler 9, which latter continues to be pressed against the film 7. Due to this, the levers 12, 42 still cannot turn back to their starting positions, and the switches 20 and 21, 22 continue to stay closed and the motor 16 continues to operate. When, finally, upon completion of the one-frame film-transport operation, the feeler 9 enters into the next film-frame perforation 7a, feeler 9 now allows three-armed lever 12 to turn counterclockwise and therefore the second three-armed lever 42 to turn clockwise. When lever 12 turns counterclockwise, its switch-controlling pin 12e moves springy contact 22 out of engagement with stationary contact 21, thereby terminating motor energization, and furthermore into engagement with stationary contact 23, thereby short-circuiting the motor. The kinetic energy of the motor is then almost instantly converted into dissipated electrical energy, and the motor therefore comes to a standstill. As a result, the pin 29a of centrifugal-force switch 29 rises permitting switch 20 to open again, at which point all switches in the motor-current path are in open setting. During the turning of three-armed lever 12, the braking lever 25 has come into engagement with the motor output pinion 16a, and the rearwards facing control edge 14b of lever 14b has once again pushed one-armed lever 26 rearwards out of the path of movement of the holding edge 40b of crank rod 40. At this point, both the shutter operation and the film-transport operation are entirely completed, and the film-transport system is once more in the setting depicted in the FIGURE.

If the camera is to operate in the sequential-exposure mode, the user must first set pushbutton 66 to its elevated setting in the manner earlier described and maintain release button 2 depressed for as long as the exposure sequence is to continue. Each constituent shutter operation and film-transport operation is then performed in the manner already described, but with switch 18 staying uninterruptedly closed and the lever arm 61b uninterruptedly located out of the path of movement of tab 40c. During the time interval between the completion of one complete rotation of crankwheel 38 and the termination of a film-transport operation, the gear segment 37 is not meshing with gear 32 and the one-armed lever 46 is located in the path of movement of holding edge 40b, i.e., until the feeler 9 enters into the next film-frame perforation 7a; this serves to assure that the crank rod 40 cannot again be triggered until the still ongoing film-transport operation is finished, i.e., until feeler 9 enters the next perforation.

When cassette film 7, 8 of the type shown is employed, the trailing end of the film cannot be pulled out of the supply compartment into the take-up compartment of the cassette. When this point is reached, the lever 12 assumes its film-transport setting, because the feeler 9 is presented with no next perforation into which to enter. Because the film 7 in the cassette 8 cannot be transported any further, the film-transport system blocks, and the drive motor 16 comes to a halt. As a result the centrifugal-force switch 29 opens switch 20, and motor energization terminates. If thereafter the user lets go of release button 2 and then inserts a fresh cassette 8 into the camera, all components will reassume the positions shown in the FIGURE.

If no cassette 8 is present in the camera, the feeler 9 is held against stop 1a, and is displaced forwards, i.e., in the direction towards where film would normally be, a distance corresponding to the length of its slot 9a. As a result lever 46 is kept pushed back, out of the path of movement of holding edge 40b. In itself this is without significance in such situation, because the trigger edge 40c is blocked by blocking edge 6a. If now it is desired to demonstrate the operation of the camera, e.g., to a potential purchaser, with no film cassette present in it, the user presses release button 2. The sequence of operations described above now occurs in substantially the same way. The switch 21, 22 is kept closed, until completion of one rotation of crankwheel 38, by means of the lever 44 via the second three-armed lever 42. Without performing an actual film transport, the shutter unit 24 is triggered, the motor switches 18, 19, 21-22 and 20 close in sequence, the motor operates, the shutter unit 24 is reset and the motor stops with the switches opening in sequence in the way already described. The camera can be demonstrated, without film in it, in both its single-exposure and sequential-exposure modes of operation, it being only necessary to set pushbutton 66 for the mode desired.

It will be understood that each of the elements described above, or two or more together, may also find a useful application in other types of constructions differing from the types described above.

While the invention has been illustrated and described as embodied in a particular film transport mechanism, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic still camera, in combination, an electric motor, a control member mounted for movement in a first direction from a first to a second position and in an opposite second direction back to the first position, drive spring means operative when the control member is not blocked for driving the control member in the first direction, motion-transmitting means responding to the control member reaching its second position by coupling the control member to the motor to cause the control member to be returned by the motor back to the first position, and an improved user-activated trigger mechanism serving to block and unblock first-direction movement of the control member, the improved user-activated trigger mechanism comprising:
   a release member which the user moves from a first position to a second position to initiate exposures,
   biasing means returning the release member to the first position thereof when the user lets go of the release member,
   first mechanical blocking means assuming a blocking setting when the release member is in its first position for blocking first-direction movement of the control member and when the release member is in its second position assuming an unblocking setting not blocking first-direction movement of the control member;
   second mechanical blocking means operative upon completion of the second-direction movement of the control member for assuming a blocking setting blocking first-direction movement of the control member at least until such time as the first blocking means reassumes its blocking setting.

2. In a camera as defined in claim 1, including means causing the second blocking means to assume its unblocking setting in response to the first blocking means assuming its blocking setting, whereby the second blocking means serves to temporarily block first-direction movement of the control member until the first blocking means can return to blocking setting.

3. In a camera as defined in claim 2, furthermore including user-set override means operative when set by the user for maintaining the second blocking means in the unblocking setting thereof, whereby so long as the first blocking means is kept in unblocking setting first-direction movement of the control member is prevented by neither the first nor the second blocking means.

4. In a camera as defined in claim 1, furthermore including user-set override means operative when set by the user for maintaining the second blocking means in the unblocking setting thereof, whereby so long as the first blocking means is kept in unblocking setting first-direction movement of the control member is prevented by neither the first nor the second blocking means.

5. In a camera as defined in claim 1, the first blocking means comprising a first blocking member mounted for movement between a blocking position in the path of movement of the control member and blocking first-direction movement of the control member and an unblocking position not in the path of movement of the control member and means responding to the release member assuming its second position by moving the first blocking member to unblocking position, the second blocking means comprising a second blocking member mounted for movement between a blocking position in the path of movement of the control member and blocking first-direction movement of the control member and an unblocking position not in the path of movement of the control member and means operative for moving the second blocking member to blocking position in response to the control member reaching a predetermined position upon completion of the second-direction movement of the control member.

6. In a camera as defined in claim 5, the second blocking member being provided with a surface so located in the path of movement followed by the first blocking member as the first blocking member moves from unblocking to blocking position that the second blocking member is moved to unblocking position by the first blocking member as the first blocking member moves from unblocking to blocking position.

7. In a camera as defined in claim 5, the second blocking member being provided with a surface so located relative to the path of movement of the control member that the control member physically obstructs the second blocking member from moving into its blocking position when the control member is blocked by the first blocking member and also during the first-direction movement of the control member and also during the second-direction movement of the control member until the control member reaches the second position thereof.

8. In a photographic still camera, in combination, film transport means including an electric film-transport motor, an elongated control member mounted for generally lengthwise movement in a first direction from a first to a second position and in an opposite second direction back to the first position, drive spring means operative when the control member is not blocked for driving the control member in the first direction, means responding to spring-driven first-direction movement of the control member by initiating a camera operation, coupling means responding to the control member reaching its second position by coupling the control member to the motor to cause the control member to be returned by the motor back to the first position and responding to the control member reaching a predetermined position for decoupling the control member from the motor, and an improved user-activated trigger mechanism serving to block and unblock first-direction movement of the control member, the improved user-activated trigger mechanism comprising:

a first blocking lever mounted for pivoting movement between a blocking position blocking first-direction movement of the elongated control member and an unblocking position not blocking first-direction movement of the control member, a second blocking lever mounted for pivoting movement between a blocking position blocking first-direction movement of the control member and an unblocking position not blocking first-direction movement of the control member, first biasing means biasing the first blocking lever in a first direction from its unblocking to its blocking position, second biasing means biasing the second blocking lever from its unblocking to its blocking position in a direction opposite to that in which the first blocking lever is biased by the first biasing means, a release member which the user moves from a first position to a second position to initiate exposures and operative upon such user-performed movement for moving the first blocking lever to unblocking position, the second blocking lever being provided with a surface so located relative to at least one of the control member and the first blocking lever that at least one of the control member and the first blocking lever physically obstruct the second blocking lever from assuming unblocking position until after the control member has both performed its first-direction movement and reached a predetermined position upon completion of its second-direction movement.

9. In a camera as defined in claim 8, the control member having a blocked portion, the first and second blocking levers when in the blocking positions thereof blocking first-direction movement of the control member by physically engaging the blocked portion and blocking the path of movement of the blocked portion, each blocking lever having a blocking surface at which the blocking lever when in blocking position engages the blocked portion, the blocking surfaces being spaced from one another in the direction of movement of the control member and so located that the blocked portion when engaged and blocked by the blocking surface of the first blocking lever engages a further surface of the second blocking lever and in that way prevents the second blocking lever from assuming blocking position.

10. In a camera as defined in claim 9, the two blocking levers being so dimensioned that when the first is blocking the blocked portion and the second is blocked by the blocked portion movement of the first blocking lever to unblocking position followed by first-direction movement of the control member results in the blocked portion of the control member travelling in the first direction of the control member intermediate the two blocking levers and furthermore keeping the second blocking lever in unblocking position until upon completion of the subsequent second-direction movement of the control member the latter reaches a predetermined position clear of the second blocking lever at which time the second biasing means becomes free to move the second blocking lever into blocking position.

11. In a camera as defined in claim 10, the first and second blocking levers being so arranged that when the second blocking lever is blocking the blocked portion of the control member and the first blocking lever is in unblocking position return of the first blocking lever to blocking position presses the second blocking lever into unblocking position so that the drive spring means can drive the control member in the first direction thereof until the blocked portion of the control member reaches and becomes blocked by the blocking surface of the first blocking lever.

12. In a camera as defined in claim 8, furthermore including user-set means operative when set for arresting the second blocking lever in the unblocking position thereof, whereby of the first and second blocking levers only the first can block the control member against first-direction movement so that first- and second-direction movement of the control member can be alternately performed of an indefinitely long period of time corresponding to the length of time that the user keeps the release member in the second position thereof.

13. In a camera as defined in claim 12, the user-set means comprising a push-to-engage push-to-release mechanism including a pushbutton at the exterior of the camera, one depression of the pushbutton by the user arresting the second blocking lever in the blocking position thereof, the next depression of the pushbutton by the user permitting the second blocking lever to return when able to the unblocking position thereof.

14. In a camera as defined in claim 13, the push-to-engage push-to-release mechanism including a hooked portion towards which the second biasing means biases the second blocking lever.

* * * * *